US012577678B2

(12) United States Patent
Mittendorfer

(10) Patent No.: US 12,577,678 B2
(45) Date of Patent: Mar. 17, 2026

(54) METHOD FOR APPLYING A PROTECTIVE COATING MATERIAL

(71) Applicant: EV Group E. Thallner GmbH, St. Florian am Inn (AT)

(72) Inventor: Gerald Mittendorfer, St. Florian am Inn (AT)

(73) Assignee: EV GROUP E. THALLNER GMBH, St. Florian am Inn (AT)

( * ) Notice: Subject to any disclaimer, the term of this patent is extended or adjusted under 35 U.S.C. 154(b) by 399 days.

(21) Appl. No.: 18/011,553

(22) PCT Filed: Jun. 8, 2021

(86) PCT No.: PCT/EP2021/065302
§ 371 (c)(1),
(2) Date: Dec. 20, 2022

(87) PCT Pub. No.: WO2022/012816
PCT Pub. Date: Jan. 20, 2022

(65) Prior Publication Data

US 2023/0287571 A1     Sep. 14, 2023

(30) Foreign Application Priority Data

Jul. 15, 2020     (DE) .......................... 102020118733.5

(51) Int. Cl.
*C23C 18/12*     (2006.01)
*G02B 1/14*      (2015.01)

(52) U.S. Cl.
CPC ...... *C23C 18/1254* (2013.01); *C23C 18/1212* (2013.01); *C23C 18/1295* (2013.01); *G02B 1/14* (2015.01)

(58) Field of Classification Search
None
See application file for complete search history.

(56) References Cited

U.S. PATENT DOCUMENTS

| | | | |
|---|---|---|---|
| 5,698,266 | A | 12/1997 | Floch et al. |
| 6,511,703 | B2 | 1/2003 | Pan et al. |
| 7,914,158 | B2 | 3/2011 | Schulz et al. |
| 8,586,144 | B2 | 11/2013 | Suzuki et al. |
| 9,745,221 | B2 | 8/2017 | Ehrensperger et al. |
| 9,939,556 | B2 | 4/2018 | Schulz et al. |
| 9,981,419 | B2 | 5/2018 | Chouiki |
| 10,473,823 | B2 | 11/2019 | Kuroda et al. |

(Continued)

FOREIGN PATENT DOCUMENTS

| | | |
|---|---|---|
| DE | 601 32 355 T2 | 5/2008 |
| DE | 10 2007 009 512 A1 | 8/2008 |

(Continued)

OTHER PUBLICATIONS

International Search Report from corresponding International Patent Application No. PCT/EP2021/065302, dated Sep. 7, 2021.

(Continued)

*Primary Examiner* — Joshua L Allen
*Assistant Examiner* — Bradford M Gates
(74) *Attorney, Agent, or Firm* — RENNER, OTTO, BOISELLE & SKLAR, LLP

(57) ABSTRACT

The invention relates to method for applying a protective coating material to a structural layer to form a protective coating.

11 Claims, 4 Drawing Sheets

(56) References Cited

U.S. PATENT DOCUMENTS

| | | | |
|---|---|---|---|
| 10,539,716 B2 | 1/2020 | Schulz et al. | |
| 10,589,457 B2 | 3/2020 | Chouiki | |
| 2002/0001672 A1 | 1/2002 | Pan et al. | |
| 2008/0204861 A1 | 8/2008 | Shiraishi | |
| 2009/0244709 A1 | 10/2009 | Suzuki et al. | |
| 2010/0033819 A1 | 2/2010 | Schulz et al. | |
| 2015/0055222 A1 | 2/2015 | Tamada et al. | |
| 2015/0103396 A1* | 4/2015 | Zollars | G02B 1/12 |
| | | | 359/350 |
| 2015/0160377 A1 | 6/2015 | Kuroda et al. | |
| 2015/0210586 A1 | 7/2015 | Ehrensperger et al. | |
| 2016/0136873 A1 | 5/2016 | Chouiki | |
| 2016/0216409 A1 | 7/2016 | Schulz et al. | |
| 2018/0203162 A1 | 7/2018 | Schulz et al. | |
| 2018/0229419 A1 | 8/2018 | Chouiki | |

FOREIGN PATENT DOCUMENTS

| | | | |
|---|---|---|---|
| DE | 10 2009 014 901 A1 | 11/2009 | |
| DE | 10 2015 101 135 A1 | 7/2016 | |
| EP | 1 340 106 B1 | 1/2008 | |
| JP | 2004055298 A | 2/2004 | |
| JP | 2005234554 A | 9/2005 | |
| JP | 2008205376 A | 9/2008 | |
| JP | 2013001007 A | 1/2013 | |
| JP | 2014029476 A | 2/2014 | |
| JP | 2015-522514 A | 8/2015 | |
| KR | 10-0953372 B1 | 4/2010 | |
| WO | WO-2014/007401 A1 | 1/2014 | |
| WO | WO-2014/202127 A1 | 12/2014 | |

OTHER PUBLICATIONS

Written Opinion from corresponding International Patent Application No. PCT/EP2021/065302, dated Sep. 7, 2021.

Diaz-Flores et al., "Qualitative evaluation of sol-gel SiO2 as a protective layer for soft surfaces," Surface & Coatings Technology 148 (2001), pp. 1-7.

Notification of Reasons for Refusal issued in Japanese Patent Application No. 2022-580893 dated Jan. 14, 2025.

Office Action issued in Korean Patent Application No. 9-5-2025-013087114 dated Feb. 7, 2025.

* cited by examiner

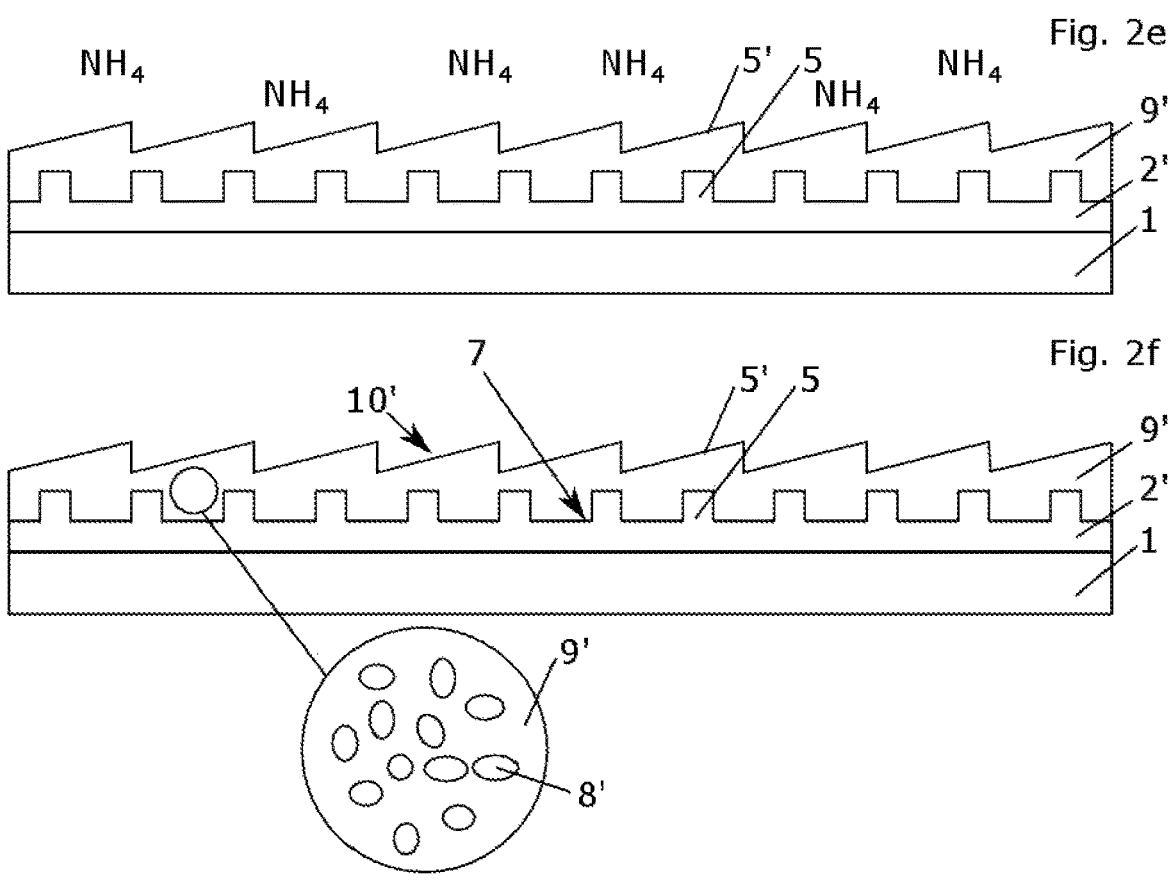
Fig. 2e
Fig. 2f
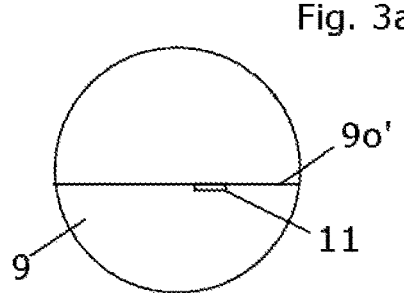
Fig. 3a
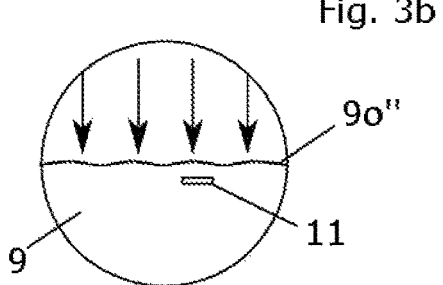
Fig. 3b
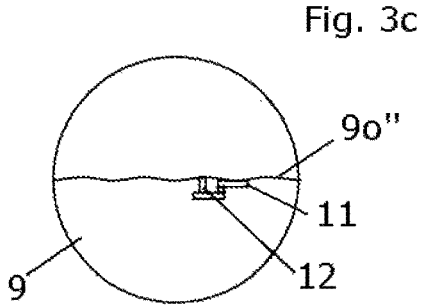
Fig. 3c
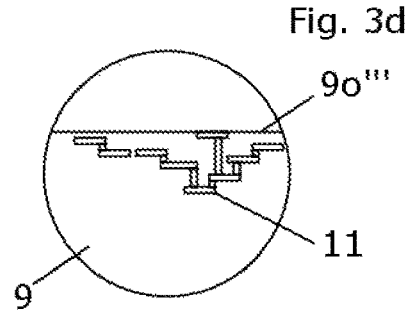
Fig. 3d

METHOD FOR APPLYING A PROTECTIVE COATING MATERIAL

FIELD OF THE INVENTION

The invention relates to a method for applying a protective layer material.

BACKGROUND OF THE INVENTION

Industry is developing ever more complicated optical systems, which are intended to permit the end user to access a new kind of communication. The latest optical systems still include structures in the nanometre and/or micrometre range. They will therefore be denoted in the following text merely as structural layers. The structures, however, are distributed in some structural layers over several millimetres or even centimetres and thus form, in comparison with the structural size, relatively large areas. For quite some time, the problem has existed that such structural layers have to be protected.

Structural layers with relatively small macroscopic dimensions are preferably encapsulated or coated in order to be protected against the environment. The mentioned novel structural layers, however, are produced on relatively large areas. They are either not separated at all or are separated into relatively large areas in subsequent process steps. The larger the area, therefore, the more unlikely encapsulation of the structural layers becomes. Furthermore, most, in particular large-area, structural layers have to be applied on generally arbitrarily formed surfaces or even produced on the same. The complicated formation makes encapsulation even more impossible. Encapsulations, therefore, are at least of secondary interest for such, in particular large-area, structural layers. Furthermore, a number of process steps are usually required to implement such encapsulations.

In the prior art, therefore, coating processes are chiefly used in order to be able to protect corresponding structural layers in the optimum manner.

Not all coating processes are suitable for coating the said structural layers, since the structural layer material can be destroyed by the coating. Either the coating or the subsequent curing process requires high temperatures in the prior art. Furthermore, it is sought to produce a protective layer which does not change or even improves the optical properties of the structural layer. This imposes a further restriction on the protective layer materials available for the coating. As protective layer materials, therefore, only oxides, in particular silicon oxides, are actually taken into account. Such oxides are deposited either by standard coating processes like PVD (physical vapour deposition) or CVD (chemical vapour deposition) at relatively high temperatures, or by a sol-gel process at close to room temperature. In the latter case, however, a conversion of the sol-gel by a curing process into the actual protective layer must take place. This curing process is in part still carried out thermally in the prior art.

The protective layer material can be deposited at low temperatures and above all cured at low temperatures, in particular at room temperature. The structural layer material, in particular the structures produced in the structural layer, is not destroyed by the low temperature. As a result of producing a protective layer over the structural layer, the structural layer is protected against chemical, mechanical and thermal influences. The protective layer must necessarily be produced from a protective layer material which is transparent for the technically relevant wavelength range, in order that the optical properties of the structural layer are retained.

The optical industry has for some years produced structural layers with the aid of imprint lithography. Soft or hard stamps are pressed into a structural layer material, which is cured in a further process step.

The structural layer thus produced is subjected to the most diverse adversities. These include chemical influences, in particular by the surrounding atmosphere, mechanical influences etc. Such structural layers have therefore hitherto been encapsulated as far as possible. The encapsulation permits the most optimum separation from the surrounding atmosphere, from dirt, liquids and gases.

The production of a protective layer represents a further possibility for the protection of a structural layer. The direct coating of structural layers by a protective layer material has until now been faced with many problems. There are numerous methods in the prior art for the production and therefore coating and/or curing of protective layers, which however have to be carried out at relatively high temperatures. Such high temperatures can however destroy a structural layer lying beneath the protective layer, in particular if it includes a structural layer material with a relatively low decomposition temperature.

Other processes are known in the prior art, in particular spin coating processes, which endeavour to circumvent such problems. With the aid of spin coating processes, protective layer materials, from the sol-gel material class, are deposited on the structural layers. In further process steps, however, the structural layer materials have to be cured, in particular at relatively high temperatures. The following curing processes must therefore still take place at relatively high temperatures, even if the coating has been carried out at low temperatures.

The aim of the present invention, therefore, is to overcome the drawbacks of the prior art and in particular to specify an improved method for the formation of a protective layer

SUMMARY OF THE INVENTION

The aforementioned drawbacks are solved with the features of the claimed invention. Advantageous developments of the invention are given in the sub-claims. All combinations of at least two features stated in the description, in the claims and/or the drawings also fall within the scope of the invention. In stated value ranges, values lying within the stated limits should also be deemed to be disclosed as limiting values and can be claimed in any combination.

The subject-matter of the invention is a method for the application of a protective layer material on a structural layer for the formation of a protective layer, preferably an oxide layer, more preferably a silicon dioxide layer, on the structural layer, wherein the application of the protective layer material takes place at a temperature less than 200° C., preferably less than 100° C., still more preferably less than 75° C., most preferably less than 50° C. with utmost preference at room temperature.

Provision is preferably made such that the application of the protective layer material takes place with a sol-gel process.

Provision is also preferably made such that the protective layer material is cured, preferably at room temperature, with an ammonia gas for the formation of the protective layer after the application on the structural layer.

Provision is also preferably made such that the preferably liquid protective layer material is converted into the protective layer, wherein the protective layer is glass-like.

Provision is also preferably made such that the structural layer includes structures, wherein the structures are constituted as optical systems.

The invention thus relates to a method for the protection of a structural layer by means of a protective layer. The structural layer is coated with a protective layer material. The application preferably takes place with a sol-gel process or the coating process is preferably a sol-gel process.

After the coating of structural layer with the protective layer material, the protective layer material is cured with an ammonia gas for the protective layer, preferably at the lowest temperatures possible, still more preferably at room temperature.

The idea underlying the invention is in particular that the preferably liquid protective layer material used is converted into a glass-like protective layer by a process at low temperatures, in particular at room temperature.

The basic idea of the present invention is, in particular, to apply a protective layer material, in particular a sol-gel, at low temperatures, in particular without heating, preferably at room temperature and/or in the region of atmospheric pressure, in particular without a separate application of pressure, on a structural layer, to coat the latter therewith and then to cure it.

In other words, the invention relates in particular to a method for the production of a nanocrystalline ceramic coating, in particular constituted as a protective layer, in particular an oxide coating, very particularly a silicon dioxide coating, at comparatively low temperatures, in particular room temperature. The silicon dioxide coating is preferably used only for coating the structural layer, but can also include functional features.

The Structural Layer

According to the invention, the structures of the structural layer are understood in particular to be optical systems.

The invention relates in particular to a method for coating an imprinted, in particularly already cured, structural layer material at low temperatures, preferably at room temperature, with a ceramic layer, preferably silicon dioxide, constituted in particular as a protective layer. Particularly preferably, the structural layer materials in which the optical systems have been imprinted are coated for the optical industry with the embodiment according to the invention.

An imprinting material, in particular a polymer, most preferably a sol-gel is used as a structural layer material for the structural layer to be produced. This is preferably deposited by a deposition process, in particular spray coating, still more preferably spin coating, on a substrate and afterwards imprinted by a stamp and cured. As structural layer materials, the following are particularly well suited polyethylene (PE)
polypropylene (PP)
cycloolefin copolymer (COC)
cycloolefin polymer (COP)
polyvinyl chloride (PVC)
polyethylene terephthalate (PET)
polyamide (PA) or polystyrol (PS)
perfluoropolyether (PFPE)
polyhedral oligomeric silsesquioxane (POSS)
polydimethylsiloxane (PDMS)
tetramethyl orthosilicate (TMOS)
tetraethyl orthosilicate (TEOS)
tetraisopropyl orthosilicate (TPOS)
poly(organo)siloxane (silicone)

A structural layer material from WO2014202127A1 is particularly preferably used. In an extension of the structural layer, nanoparticles are mixed in with the structural layer, which change the, in particular, optical and/or mechanical properties of the structural layer.

The Protective Layer

The, in particular, averaged layer thickness of the protective layer, in particular a ceramic layer, most preferably a silicon oxide layer, on the structural layer is in particular less than 1 μm, preferably less than 100 nm, still more preferably less than 10 nm, most preferably less than 1 nm. In a preferred embodiment according to the invention, the thickness of the ceramic layer/silicon oxide layer is selected such that the structures of the structural layer are completely embedded in the ceramic layer/silicon oxide layer and are covered not only with the protective layer material. The method according to the invention permits the coating of structures with virtually any shape at low temperatures, in particular at room temperature. By means of the process according to the invention, ceramics, in particular silicon dioxide, can also be deposited on the imprinted structures. A completely new opportunity is thus made available to the optical industry.

In particular, a polymer, most preferably a sol-gel, is used as a protective layer material for the protective layer. The latter is preferably deposited on the substrate by spin coating and/or spray coating, optionally imprinted by a stamp, and cured. The following are particularly well suited as protective layer materials:

polyethylene (PE)
polypropylene (PP)
cycloolefin copolymer (COC)
cycloolefin polymer (COP)
polyvinyl chloride (PVC)
polyethylene terephthalate (PET)
polyamide (PA) or polystyrol (PS)
perfluoropolyether (PFPE)
polyhedral oligomeric silsesquioxane (POSS)
polydimethylsiloxane (PDMS)
tetramethyl orthosilicate (TMOS)
tetraethyl orthosilicate (TEOS)
tetraisopropyl orthosilicate (TPOS)
poly(organo)siloxane (silicone)

A sol-gel is particularly preferably used.

According to the invention, the protective layer is constituted as a silicon dioxide layer. According to the invention, provision is in particular made such that a structural layer protected by the silicon dioxide layer can still be reached by electromagnetic radiation, without notable losses. Furthermore, it has been found that the optical properties of the structural layer are only minimally changed when the structures are completely embedded in the protective layer and covered not only by a protective layer film.

Preferably, the protective layer is a functional coating, which provides protection against the passing-through of moisture and/or gases and/or mechanical impairment.

In a further embodiment according to the invention, the protective layer can also be imprinted, in order to influence, preferably to improve, the entry of the electromagnetic rays into the protective coating and therefore onward transmission to the structural layer.

In a further embodiment according to the invention, functional units can be produced in the protective layer, in particular by a plurality of process steps.

An aspect according to the invention includes in particular the use of a low-temperature coating process for coating the structural layer, which has been imprinted from the structural layer material.

With the aid of the method according to the invention, the following structures, in particular optical elements, can in particular be coated:

lenses, in particular
  biconvex lenses
  plano-convex lenses
  biconcave lenses
  plano-concave lenses
  convex-concave lenses or concave-convex lenses
  Fresnel lenses
mirrors
diffraction elements, in particular
  diffraction gratings, in particular
    diffraction gratings, the diffraction properties of which depend on their area or their surface area (engl.: chirped diffraction ratings)
    holographic diffraction gratings
    échelle diffraction gratings
    according to physical features . . .
transmission diffraction gratings
reflection diffraction gratings
amplitude diffraction gratings
phase diffraction gratings
  according to further properties . . .
  according to the region
surface diffraction gratings
volume diffraction gratings
  according to the type of production
ruled diffraction gratings
wire diffraction gratings
imprinted diffraction gratings
self-assembled diffraction gratings Diffraction grating are chiefly coated in a preferred embodiment.

In particular, a structural layer material is selected according to the invention which has a) a flame point >0° C. and <800° C. and/or
b) a combustion point >20° C. and <850° C. and/or
b) an ignition temperature >100° C. and <700° C.
  preferably >150° C. and <500° C.

The protective layer according to the invention can in particular be optimised with respect to permeability or impermeability of gases. This would mainly be appropriate when the structural layer material can still outgas in the course of time and swelling of the deposited protective layer should/must be prevented.

If the protective layer according to the invention is to be optimised for the permeability of gases, the protective layer is produced in such a way that it includes an open porosity. The porosity is defined by the degree of porosity. According to the invention, this is defined as the ratio between the pore volume and the total volume. If there are no pores in the material, the degree of porosity is correspondingly zero. The degree of porosity for permeable ceramic layers according to the invention is in particular greater than 0.0001%, preferably greater than 0.01%, more preferably greater than 1%, most preferably greater than 5%, with greatest preference greater than 10%, most preferably of all greater than 25%. In particular, it can thus be established how many molecules can pass through the protective layer per unit of time.

Since the protective layer is intended to serve primarily for the protection of the structural layer, without changing the optical properties of the structural layer lying beneath, the pore size should not lie in the order of magnitude range of the electromagnetic radiation for which the structural layer has been designed. For visible light, that would be a wavelength range of approx. 200 nm-700 nm. The pore size should therefore be well below 200 nm, preferably below 100 nm, more preferably below 50 nm, most preferably below than 25 nm, with utmost preference below 10 nm. In particular, the pores must however still remain large enough to enable the passage of an escaping gas through the protective layer.

For permeable protective layers, an average pore diameter or an average pore size will therefore be selected by the process according to the invention in particular at least as large as the average diameter of the type of molecule which should pass through the protective layer. For permeable protective layers, the average pore diameter is therefore preferably greater than 1 nm, preferably greater than 10 nm, more preferably greater than 50 nm, most preferably greater than 100 nm.

The average pore diameter is understood to mean the average diameter of the pores. The pores are preferably assumed to be radially symmetrical.

In a combination of a plurality of pores along a stretch and the formation of a pore tube, this would accordingly be the average tube diameter. The average pore diameter in particular represents an upper limiting value for the molecular size of the molecules which should be able to escape out of the protective layer via the pores.

If the protective layers according to the invention are to be optimised for the impermeability of gases, the protective layer is in particular applied in such a way that it has a closed porosity, still more preferably no porosity. The degree of porosity is in particular less than 25%, preferably less than 10%, more preferably less than 5%, still more preferably less than 1%, most preferably less than 0.01%, with utmost preference less than 0.0001%. Such impermeable protective layers require that the structural layer no longer outgases. In this case, however, compact protective layers are to be preferred, because then they separate the structural layer lying beneath at all events completely from the surrounding atmosphere.

For impermeable protective layers, the average pore diameter is in particular less than 100 nm, preferably less than 50 nm, more preferably less than 10 nm, most preferably less than 1 nm.

In a very particularly preferred embodiment according to the invention, the production of the protective layer includes a multi-stage process. In a first process step, the protective layer is produced porous, so that outgassing of the structural layer is still possible for a certain amount of time. In a second process step, the protective layer is then closed, so that the number of pores and their size become minimal, preferably completely disappear.

In an embodiment according to the invention, the low-temperature coating process is used to coat a first side of a first substrate, which includes optical systems, with a ceramic layer according to the invention, in particular a silicon dioxide layer. The layer thickness of the ceramic layer is in particular less than 1 µm, preferably less than 100 nm, still more preferably less than 10 nm, most preferably less than 1 nm and preferably includes one of the aforementioned porosity properties. In a particularly preferred embodiment, the optical elements are completely embedded.

In another embodiment, the low-temperature coating process is used to coat both sides of a first substrate with a ceramic layer according to the invention, in particular a silicon dioxide layer. The thickness of the first ceramic layer on the first side of the substrate is in particular less than 1 μm, preferably less than 100 nm, still more preferably less than 10 nm, most preferably less than 1 nm and includes, in particular related to both ceramic layers together, preferably one of the aforementioned porosity properties. In particular, the thickness of the second ceramic layer on the second side of the substrate is the same as the thickness of the first ceramic layer on the first side of the substrate. The thicknesses of the two ceramic layers can however also be different, in order to be able to take account of different demands made on the two sides. Such a method is appropriate mainly when it is a substrate on which optical systems have been imprinted on both sides.

In an extension of the protective layer, nanoparticles are mixed in with the protective layer, which change the, in particular, optical and/or mechanical properties of the structural layer.

Coating Process

In the embodiments according to the invention, the protective layer is produced by a low-temperature coating process, which prevents oxidation, thermal decomposition or pyrolysis of the structural layer. A particularly preferred process is a low-temperature coating process in which a silicon oxide layer is deposited in an ammonia atmosphere.

In this section, therefore, the protective layer material for this special embodiment is referred to as a silicon precursor (silicon precursor, i.e. a molecule containing silicon).

In a first process step, a silicon precursor with a water content of less than 50 vol-%, preferably less than 25 vol-%, still more preferably less than 10 vol-%, most preferably less than 5 vol-%, is produced by mixing a silicate, in particular an oligomeric organosilicate, still more preferably a silicic acid tetramethyl ester homopolymer, with a solvent. The oligomeric organosilicate typically and in particular includes predominantly silicic acid tetramethyl ester monomers. It can be supplemented with any other monomers. The solvent is in particular an alcohol, water or an alcohol-water mixture. The silicon precursor preferably includes a quantity ratio of 0.01-1 part water to 0.02-100 parts alcohol, related to 1 part of the underlying polymer. The pH value of the precursor lies between 0 and 14, preferably between 3 and 11, still more preferably between 5 and 9, most preferably at 7.

In a second process step, this silicon precursor is applied on the structural layer. The application takes place by one of the following processes:

rotation coating (spin process)

spray coating chemical vapour deposition (CVD)

plasma-supported chemical vapour deposition (PE-CVD)

physical vapour deposition (PVD)

dip coating electrochemical coating currentless deposition organo-metallic decomposition sol-gel processes The silicon precursor is preferably applied by a sol-gel process.

In a third process step, the deposited silicon precursor is cured in an ammonia-containing atmosphere.

The Curing Process

After the coating, the applied precursor layer is exposed to ammonia in an ammonia atmosphere. The ammonia atmosphere in particular includes predominantly water, ammonia and alcohol. The atmosphere for the curing according to the invention is produced in particular from a liquid mixture of alcohol and ammonia solution. The volume ratio of alcohol to ammonia solution lies between 0.01 and 100, preferably between 0.1 and 10, most preferably at 1. Preferably, therefore, these quantities of alcohol and ammonia are used. For example, with 10 ml of alcohol, 10 ml of ammonia solution is preferably used to produce the atmosphere. The concentration of the ammonia solution lies between 5% and 50%, preferably between 10% and 40%, most preferably between 20% and 30%, with utmost preference at 25%. The produced liquid mixture vaporises and thus provides the ammonia atmosphere which cures the silicon precursor.

In a preferred embodiment according to the invention, the introduction of ammonia gas into the working chamber takes place. The ammonia gas is preferably mixed with an alcohol, in particular methanol. Furthermore, an addition of a carrier gas, in particular of nitrogen, for the transport of the alcohol and/or the ammonia takes place. By the introduction of an ammonia gas, ammonia solutions as a liquid can be completely dispensed with.

In both embodiments according to the invention, the pressure during curing of the silicon precursor in the working chamber lies between $10^{-3}$ mbar and 10 bar, preferably between $10^{-1}$ mbar and 5 bar, still more preferably between 0.8 bar and 1.2 bar, most preferably at 1 bar.

In order to achieve a high product throughput in the production of the coated structural layer, it has been shown to be advantageous to carry out the curing of the silicon precursor in a continuous hardener. This is a device which is passed through by the substrates, on which the structural layer and the silicon precursor have been produced or deposited. The continuous hardener has an entrance, a curing chamber, which is rinsed with the ammonia gas according to the invention and, if necessary, is correspondingly temperature controlled, and an exit. A conveyor belt preferably runs through the continuous hardener. Continuous production and a high throughput are thus enabled.

The silicon precursor for the protective layer according to the invention is cured by the process according to the invention for the silicon precursor curing.

An essential advantage according to the invention includes the fact that the production of protective layers is possible at room temperature or at least at very low temperatures, in particular temperatures below the flame point and/or the combustion point and/or the ignition point of the structural layer material. Only then is the coating according to the invention of the structural layer with the protective layer thus enabled.

BRIEF DESCRIPTION OF THE DRAWINGS

Further advantages, features and details of the invention emerge from the following description of preferred examples of embodiment and with the aid of the drawings. In the figures:

FIG. 2e shows an alternative third process step for the production of a protective layer, FIG. 2f shows fourth process step for the production of a protective layer, FIG. 3a shows the first process step for the modification of a protective layer, FIG. 3b shows the second process step for the modification of a protective layer, FIG. 3c shows the third process step for the modification of a protective layer, FIG. 3d shows the fourth process step for the modification of a protective layer.

DETAILED DESCRIPTION OF THE INVENTION

In the figures, identical components or components with the same function are denoted by the same reference numbers.

In particular, the structures of the imprinted polymer layer are greatly enlarged and not reproduced true to scale, in order to clarify the representation.

Figures 1A, 1B, 1C, 1D:
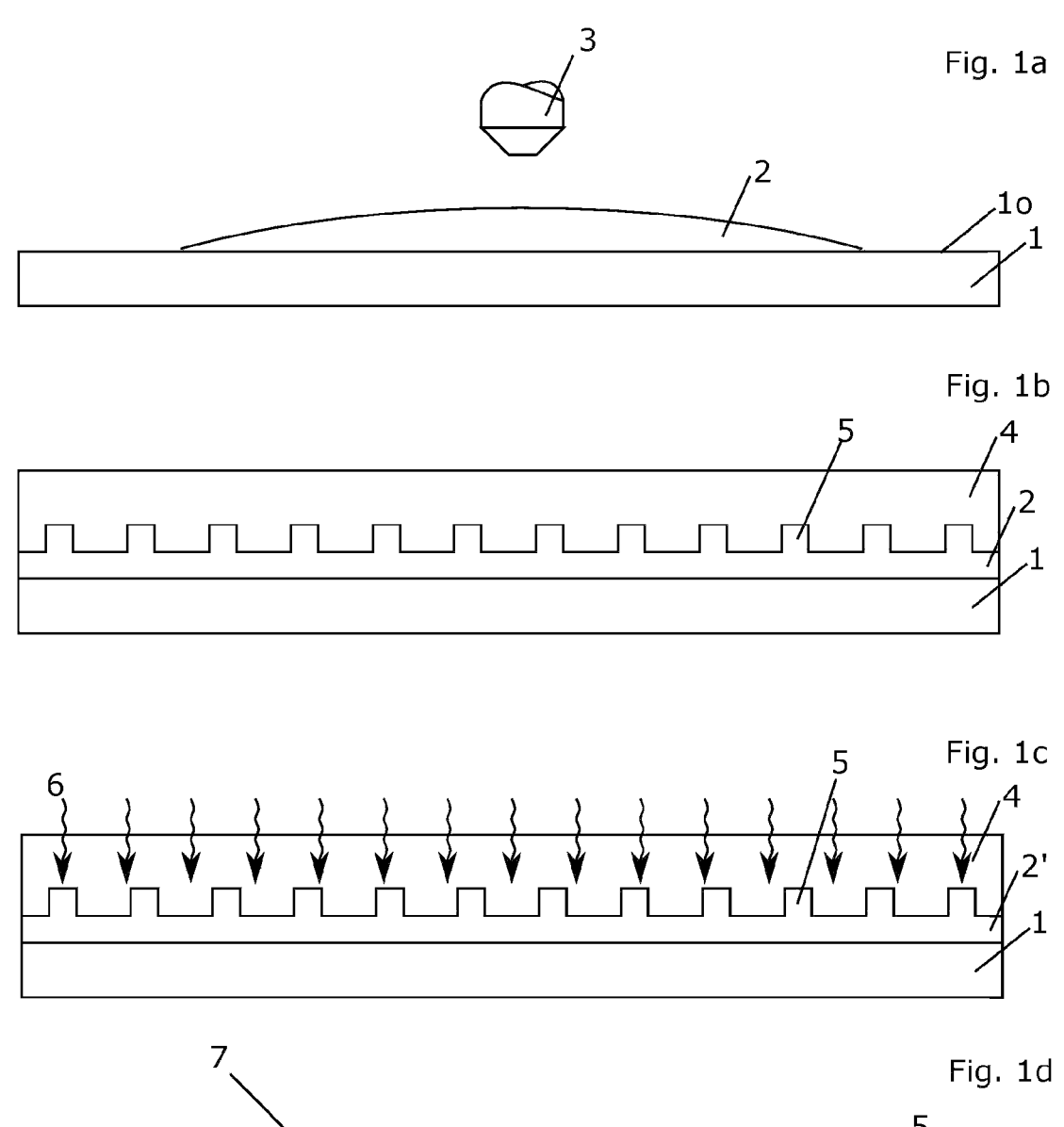
FIG. 1*a* shows a first process step for the production of a structural layer.
FIG. 1*b* shows a second process step for the production of a structural layer.
FIG. 1*c* shows a third process step for the production of a structural layer.
FIG. 1*d* shows a fourth process step for the production of a structural layer.

FIG. 1a shows the first process step for the production of a structural layer 7 (see FIG. 1d) on a substrate 1. A structural layer material 2 is deposited by a deposition system 3 on substrate 1. The deposition system is represented symbolically by an outlet opening. Deposition system 3 is preferably a simple hose system, via which structural layer material 2 is deposited on substrate 1. Deposition system 3, however, can for example also be a CVD/PVD system. The distribution of structural layer material 2 is carried out in a further process step not represented, for example by rotation of substrate 1.

FIG. 1b shows a second process step for the production of a structural layer (see FIG. 1d) on a substrate 1. With the aid of a stamp 4, the imprinting takes place and thus the structuring of structural layer material 2. By means of the imprinting, structures 5 are produced in structural layer material 2, which in particular should include optical properties. Preferably, it is a diffraction grating.

FIG. 1c shows as a third process step for the production of a structural layer 7 (see FIG. 1d) on a substrate 1. The third process step includes a curing process of the structural layer material 2. The curing preferably takes place by an influence 6. Influence 6 is preferably electromagnetic radiation, in particular UV light, or heat. Most preferably, the curing takes place, as represented graphically, by means of stamp 4.

FIG. 1d shows a fourth process step for the production of a structural layer 7 on a substrate 1. In this process step, the demoulding of stamp 4 from cured structural layer material 2' takes place. The detail represents an enlarged part of structural layer 7, in which particles 8 can be detected. Particles 8 can have been mixed in with structural layer material 2, 2', in order to change its, in particular, optical and/or mechanical properties.

Figures 2A, 2B, 2C, 2D:
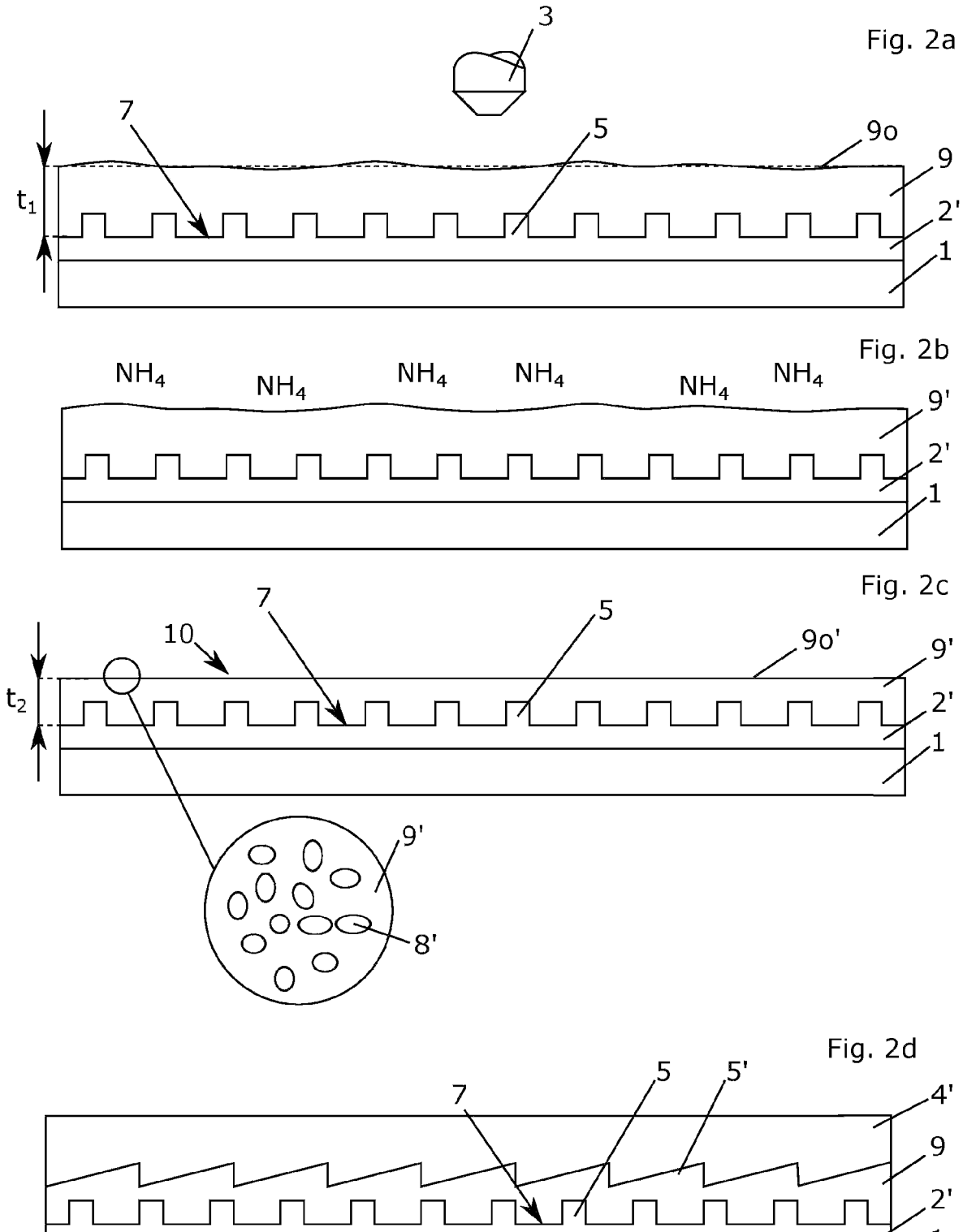
FIG. 2*a* shows a first process step for the production of a protective layer.
FIG. 2*b* shows a second process step for the production of a protective layer.
FIG. 2c shows a third optional process step for the production of a protective layer.
FIG. 2d shows an alternative second process step for the production of a protective layer.

FIG. 2a shows a first process step according to the invention for the deposition of a protective layer material 9 with an average thickness t1 on produced structural layer 7. The deposition takes place by a deposition system 3. Deposition system 3 is preferably the same deposition system 3 with which structural layer material 2 was also deposited.

FIG. 2b shows the most important step according to the invention for room-temperature curing of protective layer material 9 with the aid of an ammonia-containing atmosphere.

FIG. 2c shows a further optional process step for the production of a protective layer 10 for a structural layer 7. The process step includes primarily a planarisation and/or removal of the already cured protective layer material 9' to a layer thickness t2. Such a process is necessary particularly when it is intended to functionalise protective layer surface 9o' in further process steps (see FIGS. 3a-3d). The detail represents an enlarged part of protective layer 10, in which particles 8' can be detected. Particles 8' can have been mixed in with protective layer material 9, 9', in order to change its, in particular, optical and/or mechanical properties. The use of different particles 8, 8' in structural layer 7 and protective layer 10 can be modified chiefly when structural layer material 2' and protective layer material 9' are chemically and physically identical. In most cases, however, this is not the case. In order to highlight the difference between particles 8, 8', an elliptical geometry was in part selected for particles 8'.

FIG. 2d shows an alternative second process step, which is distinguished by imprinting of the protective layer material 9 by means of a stamp 4'. In protective layer material 9, structures 5' are produced which have an effect on the optical properties of structural layer 7. Structures 5' can for example be a diffraction grating, which deflects photons with a certain wavelength or a transmission grating in order to convey the photons in a targeted manner onto structural layer 7. In the present example, structures 5' are parts of an echelle diffraction grating, whereas structures 5 are parts of a standard diffraction grating. It thus concerns here only one of many possible embodiments which is represented as an example. Structures 5 could just as well have been formed as échelle diffraction gratings.

FIG. 2e shows the most important step according to the invention for the room-temperature curing of the imprinted protective layer material 9' with the aid of an ammonia-containing atmosphere. This process step is essentially identical to the process step from FIG. 2b.

FIG. 2f shows an alternative end product according to the invention with a structured structural layer 10'. The detail represents an enlarged part of protective layer 10, in which particles 8' can be detected. Particles 8' can have been mixed in with protective layer material 9, 9', in order to change its, in particular, optical and/or mechanical properties.

The following four figures describe a process, which on account of the complexity will probably be difficult to implement. Nonetheless, the corresponding possibility should be disclosed here.

FIG. 3a shows a first process step of a possible surface modification of protective layer surface 9o'. The production of a functional unit 11 in the surface (again by a plurality of process steps which are not represented here) would be conceivable. For this purpose, either protective layer material 9 itself must be suitable for being able to produce corresponding functional units 11, or a corresponding material must be introduced into protective layer material 9. For example, the use of an atomic layer deposition would be conceivable, in order to deposit a monocrystalline material. A corresponding IC could then be produced in a monocrystalline material. It is also conceivable and more preferable for the functional unit to be a prefabricated microchip or nanochip, which has been positioned by a pick-and-place operation on protective layer material 9.

FIG. 3b shows a second process step of a possible surface modification of protective layer surface 9o' to form protective layer surface 9o". Functional unit 11 can be covered by a further deposition of a protective layer material 9.

FIG. 3c shows a third process step of a possible surface modification of protective layer surface 9o". By means of further process steps, so-called vias 12 can be produced, which can connect functional units 11 with one another.

FIG. 3d shows the end state of a possible surface modification of protective layer surface 9o". A plurality of, in particular, fully operational functional units 11 have been produced in protective layer surface 9o'". The density, the spacing and the size of functional units 11 must lie in an order of magnitude range well below the transmitted electromagnetic radiation, which is intended to reach structures 5 of structural layer 7. Otherwise, functional units 11 and/or the vias would act as undesired scatter centres and ruin the functionality of the entire product.

Figure 4:
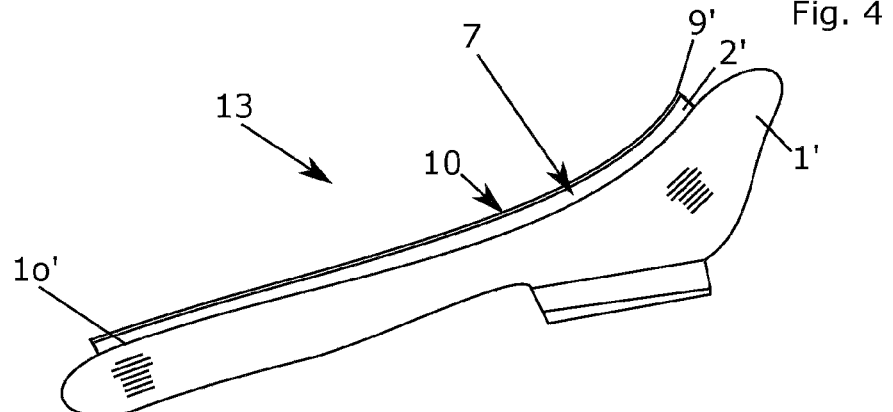
FIG. 4 shows a component with an applied structural and protective layer.

FIG. 4 shows an exemplary macroscopic component 13 formed geometrically complicated, including a substrate 1', on substrate surface 1o' of which a structural layer 7 is applied, which in turn is coated with a protective layer 10 according to the invention. The figure is intended to show that structural layers 7 produced and coated according to the invention can be produced very well on surfaces 1o of arbitrary geometry and can be deposited at least by a transfer process. The gas introduced at room temperature, which is used for the curing of protective layer 10, can also flow around complicated component geometries. Furthermore, component 13, which can generally already include a plurality of temperature-sensitive components, is not subjected to any temperature load.

In the case of the transfer of a structural layer 7 onto a substrate 1', the small layer thickness of protective layer 10 also contributes positively to adapting to an arbitrary geometry.

LIST OF REFERENCE NUMBERS

1, 1' substrate
1o, 1o' substrate surface
2, 2' structural layer material
3 deposition system
4, 4' stamp
5, 5' structure
6 influence
7 structural layer
8, 8' particles

9, 9' protective layer material
9o, 9o', 9o", 9o'" protective layer surface
10, 10' protective layer
11 functional unit
12 vias
13 component
t1, t2 layer thickness

What is claimed is:

1. A method for forming a protective layer on a structural layer, the method comprising:
    applying a protective layer material on the structural layer at a temperature less than 200° C. to form the protective layer, the formed protective layer consisting of silicon dioxide; and
    imprinting the formed protective layer to produce protective layer structures to improve entry of electromagnetic rays into the imprinted protective layer and the structural layer,
    wherein the structural layer includes optical system structures.

2. The method according to claim 1, wherein the application of the protective layer material takes place with a sol-gel method.

3. The method according to claim 1, wherein the protective layer material is cured with an ammonia gas for the formation of the protective layer at room temperature, after the application of the protective layer material.

4. The method according to claim 1, wherein the protective layer material is liquid,
    wherein the liquid protective layer material is converted into the protective layer, and
    wherein the protective layer is vitreous.

5. The method according to claim 1, wherein the protective layer material is applied at a temperature less than 100° C.

6. The method according to claim 1, wherein the protective layer material is applied at a temperature less than 75° C.

7. The method according to claim 1, wherein the protective layer material is applied at a temperature less than 50° C.

8. The method according to claim 1, wherein the protective layer material is applied at a room temperature.

9. The method according to claim 1, wherein the formed protective layer is transparent.

10. The method according to claim 1, wherein the structural layer includes a diffraction grid.

11. The method according to claim 1, wherein optical system structures are constituted as an optical system.

* * * * *